United States Patent
Ikebukuro

(10) Patent No.: US 9,521,833 B2
(45) Date of Patent: Dec. 20, 2016

(54) RECIPROCATING MECHANISM FOR A FISHING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 225 days.

(21) Appl. No.: 14/527,913

(22) Filed: Oct. 30, 2014

(65) Prior Publication Data

US 2015/0201597 A1    Jul. 23, 2015

(30) Foreign Application Priority Data

Jan. 23, 2014 (JP) .................................. 2014-010111

(51) Int. Cl.
*A01K 89/01* (2006.01)

(52) U.S. Cl.
CPC ... *A01K 89/01143* (2015.05); *A01K 89/01917* (2015.05)

(58) Field of Classification Search
CPC ............ A01K 89/015; A01K 89/01912; A01K 89/019125; A01K 89/01917; A01K 89/01143

See application file for complete search history.

(56) References Cited

U.S. PATENT DOCUMENTS

| 2,314,032 | A | * | 3/1943 | Coxe | A01K 89/015 192/41 R |
|---|---|---|---|---|---|
| 3,447,760 | A | * | 6/1969 | Sarah | A01K 89/015 242/279 |
| 4,974,792 | A | * | 12/1990 | Miyazaki | A01K 89/015 242/279 |
| 5,131,596 | A | * | 7/1992 | Sato | A01K 89/015 242/279 |
| 5,775,614 | A | * | 7/1998 | Yamaguchi | A01K 89/015 242/261 |
| 6,003,801 | A | * | 12/1999 | Kobayashi | A01K 89/015 242/310 |
| 6,053,444 | A | * | 4/2000 | Yamaguchi | A01K 89/015 242/275 |
| 2004/0144877 | A1 | * | 7/2004 | Kawasaki | A01K 89/015 242/278 |
| 2005/0224617 | A1 | * | 10/2005 | Nakagawa | A01K 89/015 242/310 |
| 2012/0067993 | A1 | * | 3/2012 | Nakagawa | A01K 89/015 242/257 |
| 2015/0090819 | A1 | * | 4/2015 | Shimizu | A01K 89/01 242/241 |

FOREIGN PATENT DOCUMENTS

JP        2013-243997 A    12/2013

* cited by examiner

*Primary Examiner* — Emmanuel M Marcelo
(74) *Attorney, Agent, or Firm* — Global IP Counselors

(57) ABSTRACT

A level winding mechanism includes a worm shaft, an engagement member, a sliding member, and a lid member. The lid member includes lid portion and a retaining portion. The lid portion covers one end of a first through-hole. The retaining portion is tubular shaped and is housed inside the first through-hole. Additionally, the retaining portion is disposed between an inner perimeter surface of the first through-hole and an outer perimeter surface of the engagement member. The retaining portion is capable of slidably and rotatably retaining the engagement member.

8 Claims, 6 Drawing Sheets

# RECIPROCATING MECHANISM FOR A FISHING REEL

CROSS-REFERENCE TO RELATED APPLICATIONS

This application claims priority to Japanese Patent Application No. 2014-10111, filed on Jan. 23, 2014, the entirety of which is hereby incorporated by reference in its entirety.

BACKGROUND

Field of the Invention

This present invention relates to a reciprocating mechanism for a fishing reel.

Background Information

In general, many fishing reels include a reciprocating mechanism. For example, as shown in Japanese Laid-Open Patent Publication No. 2013-243997, a dual-bearing reel includes a reciprocating mechanism (the so-called level winding mechanism) for evenly winding a fishing line onto a spool.

Generally, a reciprocating mechanism comprises a worm shaft having a spiral groove, an engagement member, and a sliding member. The engagement member engages the spiral groove of the worm shaft. The engagement member reciprocates along the worm shaft with the rotation of the worm shaft. The sliding member retains the engagement member, and integrally reciprocates with the engagement member.

SUMMARY

As described above, the sliding member also reciprocates with the engagement member reciprocating along the worm shaft. As a result, a fishing line that is guided by the sliding member can be evenly wound onto the spool. Therefore, it is important that the engagement member reciprocate smoothly. Thus, it is desirable to suppress the rattling when the engagement member reciprocates.

Accordingly, an object of the present invention is to suppress rattling when the engagement member reciprocates.

The reciprocating mechanism according to the present invention is a reciprocating mechanism for a fishing reel. The reciprocating mechanism comprises a worm shaft, an engagement member, a sliding member, and a lid member. The worm shaft includes a spiral groove. The engagement member engages the spiral groove. The sliding member includes a through-hole and slides along the worm shaft. The lid member comprises a retaining portion and a lid portion. The retaining portion is housed in the through-hole and is formed in a tubular shape. The lid portion covers one end of the through-hole. The retaining portion is disposed between an inner surface of the through-hole and an outer peripheral surface of the engagement member, and slidably and rotatably retains the engagement member.

In a conventional reciprocating mechanism, the engagement member is retained by a through-hole that is formed in the sliding member. In contrast, in the reciprocating mechanism of the present invention, the engagement member is retained by a tubular retaining portion. Therefore, compared to the conventional reciprocating mechanism, the retaining portion is able to retain the engagement member in a position that is closer to the worm shaft. As a result, rattling is suppressed when the engagement member is being reciprocated.

Additionally, as described above, since the retaining portion is capable of suppressing the rattling of the engagement member, the axial length of the engagement member can be shorter than in the prior art. In other words, the axial length of the through-hole of the sliding member can be shorter than the prior art, and thus, the sliding member can be formed so as to be compact.

Preferably, the retaining portion comprises an outer tubular portion and an inner tubular portion. The outer tubular portion contacts the inner surface of the through-hole. The inner tubular portion is disposed between the inner surface of the outer tubular portion and the outer peripheral surface of the engagement member.

According to this configuration, the inner tubular portion and the outer tubular portion can be separate members. Thus, by forming the inner tubular portion from a material with a low coefficient of friction, the engagement member is capable of being smoothly rotated and slid.

The inner tubular portion can be a sliding bushing made of resin, or the inner tubular portion can be a bearing.

The inner tubular portion can be formed so as to be longer than the length of the through-hole in the passing-through direction. Additionally, the outer tubular portion can be shorter than the length of the through-hole in the passing-through direction.

Preferably, a female threaded portion is formed in at least one portion of the inner surface of the through-hole. A male threaded portion that is screwed into the female threaded portion is formed on at least one portion of the outer peripheral surface of the retaining portion. According to this configuration, the lid member can be fixed with the sliding member with the retaining portion that is housed in the through-hole of the sliding member. As a result, the portions of the lid member besides the lid portion can be housed in the sliding member, and thus, can be more compact.

The retaining portion can also be longer than the length of the through-hole in the passing-through direction.

Preferably, the reciprocating mechanism comprises a tubular guide member. The guide member is disposed around the outer periphery of the worm shaft and guides the sliding member. The guide member includes a window portion that allows the engagement of the spiral groove and the engagement member. Accordingly, in this configuration, the reciprocation of the sliding member can be smoother.

One portion of the retaining portion can be housed in the window portion.

The sliding member can comprise a fishing line guide portion for guiding the fishing line.

According to the present invention, the rattling can be suppressed when the engagement member reciprocates.

BRIEF DESCRIPTION OF THE DRAWINGS

Referring now to the attached drawings which form a part of this original disclosure.

DETAILED DESCRIPTION OF EMBODIMENTS

Figure 1:
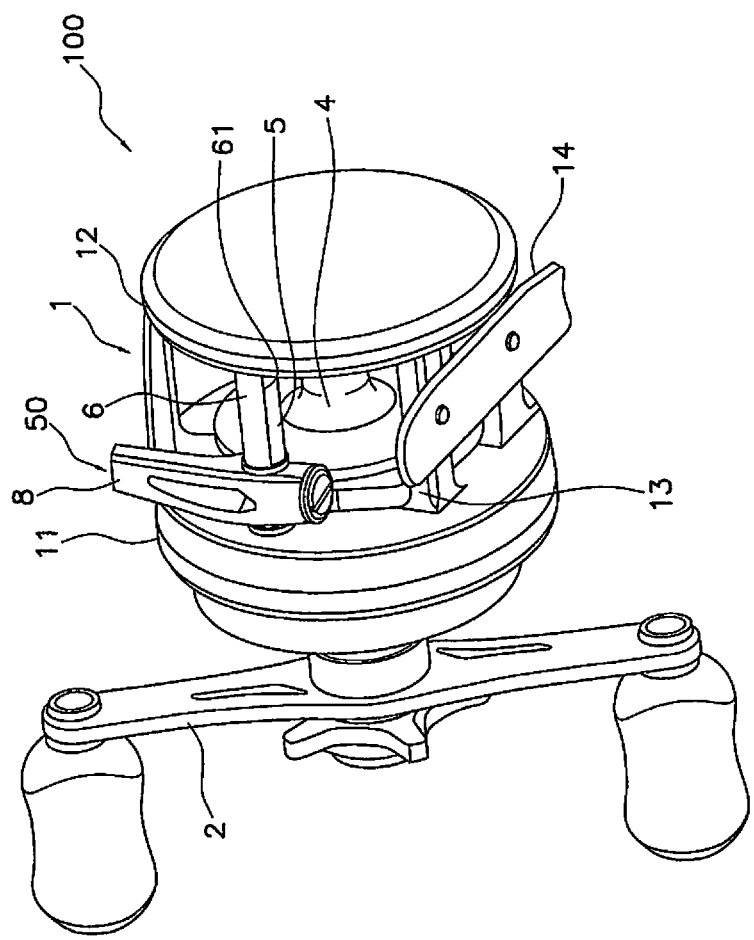
FIG. 1 is a perspective view of a dual bearing reel.

An embodiment of the reciprocating mechanism according to the present invention is explained below, with reference to the drawings. FIG. 1 is a perspective view of a dual-bearing reel including a reciprocating mechanism, and FIG. 2 shows a cross-sectional view thereof.

Figure 2:
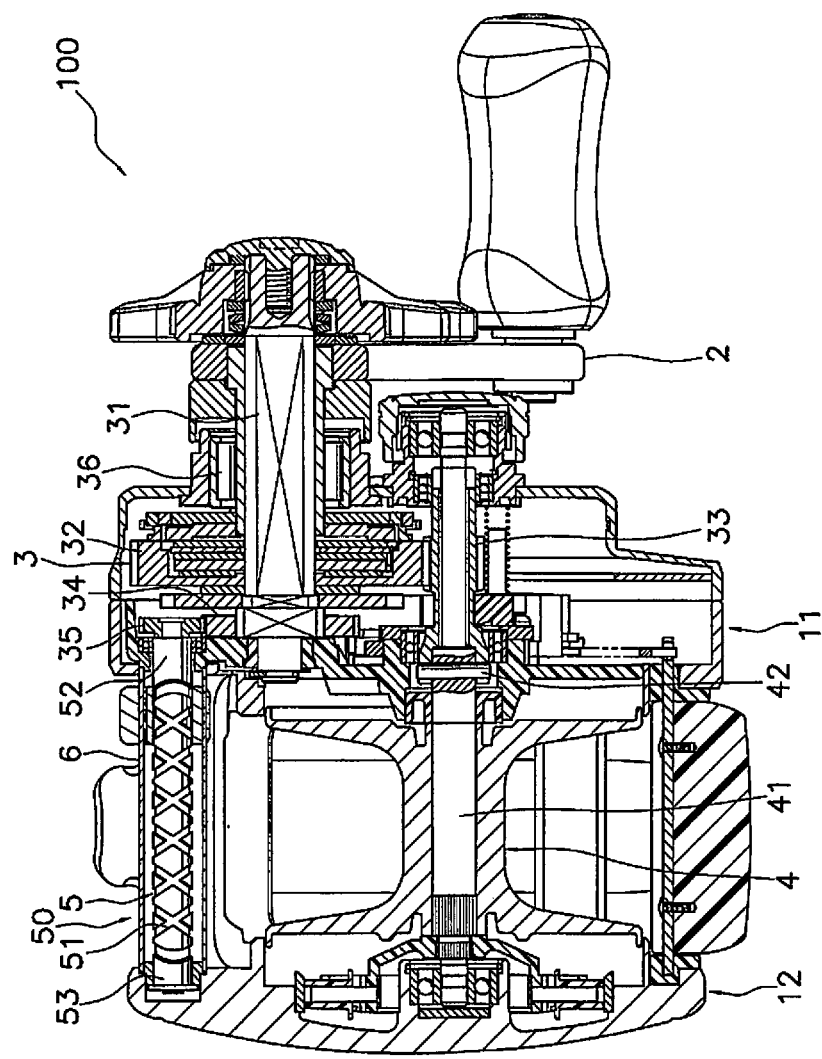
FIG. 2 is a cross-sectional view of the dual bearing reel.

As shown in FIG. 1 and FIG. 2, the dual-bearing reel 100 according to the present embodiment unreels a fishing line a forward direction (the upper-left direction in FIG. 1). The dual-bearing reel 100 comprises a reel body 1, a handle 2, a rotation transmission mechanism 3, a spool 4, and a level winding mechanism 50 (one example of a reciprocating mechanism).

As shown in FIG. 1, the reel body 1 comprises a first body portion 11, a second body portion 12, multiple connecting portions 13, and a mounting portion 14. The first body portion 11 and the second body portion 12 oppose each other. As shown in FIG. 2, the first body portion 11 and the second body portion 12 support a spool shaft 41.

As shown in FIG. 1, each of the connecting portions 13 connects the first body portion 11 and the second body portion 12. The mounting portion 14 extends in a longitudinal direction and is configured to be mounted to a fishing rod. Of the connecting portions 13, at least one connecting portion 13 is fixed to the mounting portion 14.

As shown in FIG. 2, the handle 2 is rotatably mounted on the outside surface of the first body portion 11. The spool 4 and the level winding mechanism 50 are driven via the rotation transmission mechanism 3 by rotating the handle 2.

The rotation transmission mechanism 3 is a mechanism for transmitting the rotation of the handle 2 to the spool 4 and to the level winding mechanism 50. The rotation transmission mechanism 3 is disposed in the first body portion 11. The rotation transmission mechanism 3 comprises a drive shaft 31, a drive gear 32, a pinion gear 33, a first gear 34 and a second gear 35.

The drive shaft 31 is coupled to the handle 2 and integrally rotates with the handle 2. The drive shaft 31 is prevented from rotating in the line-delivering direction by a one-way clutch 36. The drive gear 32 is mounted on the drive shaft 31 and integrally rotates with the drive shaft 31. The pinion gear 33 meshes with the drive gear 32, and has a tubular shape. The first gear 34 is mounted on the drive shaft 31 and integrally rotates with the drive shaft 31. The second gear 35 meshes with the first gear 34.

The spool 4 is disposed between the first body portion 11 and the second body portion 12. A fishing line is wound on an outer peripheral surface of the spool 4. The spool 4 is fixed to a spool shaft 41 and integrally rotates with the spool shaft 41.

The spool shaft 41 is rotatably supported on the first body portion 11 and the second body portion 12 via an axle bearing member. The end of the spool shaft 41 on the first body portion 11 side passes through the pinion gear 33. The spool shaft 41 engages the pinion gear 33 via a clutch mechanism. When the clutch mechanism is in a clutch-on state, the spool shaft 41 and the pinion gear 33 engage each other and are integrally rotatable. Additionally, if the clutch mechanism is in a clutch-off state, the engagement between the spool shaft 41 and the pinion gear 33 is released, and the spool shaft 41 and the pinion gear 33 are rotatable independently of each other. In particular, the pinion gear 33 engaging the spool shaft 41, and the engagement being released, are both accomplished via an engagement pin 42 that passes through the spool shaft 41. The pinion gear 33 engages the engagement pin 42 when moving to the left side in FIG. 2, and the engagement with the engagement pin 42 is released when moving to the right side, as shown in FIG. 2.

Figure 3:
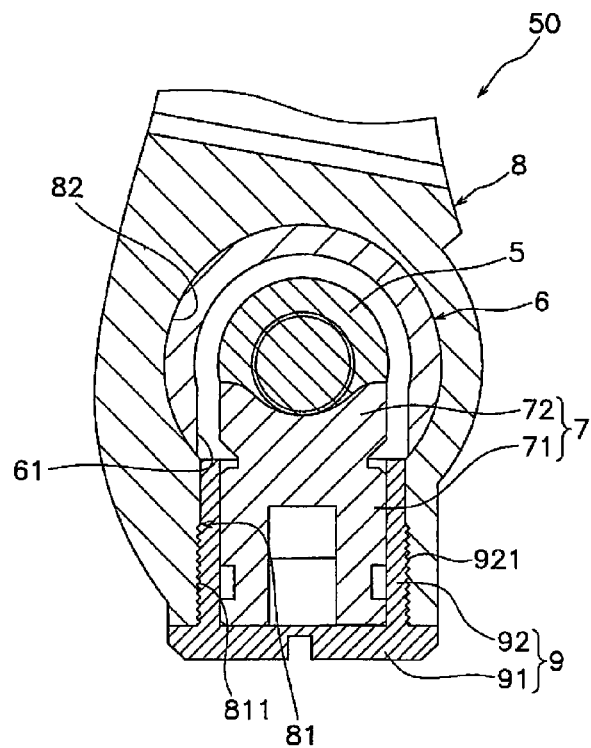
FIG. 3 is a cross-sectional view of a level winding mechanism.
Figure 4:
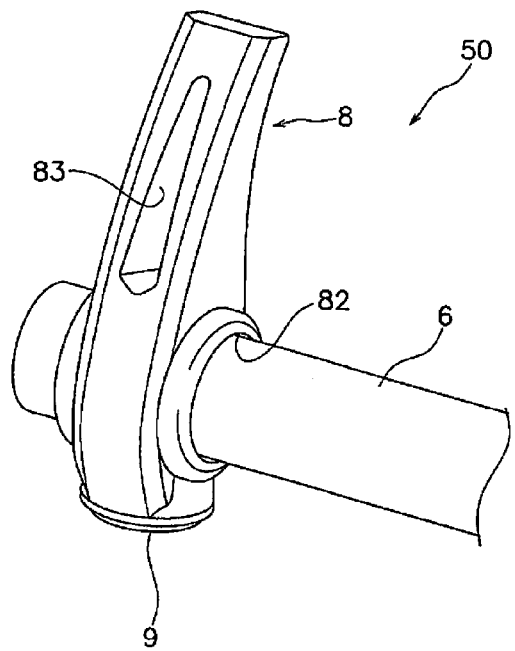
FIG. 4 is a perspective view of the level winding mechanism.

FIG. 3 is a cross-sectional view showing the level winding mechanism 50, and FIG. 4 is a perspective view showing the level winding mechanism 50. The level winding mechanism 50 is a mechanism that reciprocates in order to evenly wind the fishing line on the spool 4. As shown in FIG. 3 and FIG. 4, the level winding mechanism 50 comprises a worm shaft 5, a guide member 6, an engagement member 7, a sliding member 8, and a lid member 9.

As shown in FIG. 2, the worm shaft 5 is formed in a cylindrical shape and comprises a spiral groove 51 on the outer peripheral surface. The worm shaft 5 extends essentially parallel to the spool shaft 41. Additionally, the worm shaft 5 extends between the first body portion 11 and the second body portion 12.

A first end portion 52 of the worm shaft 5 is rotatably supported on the first body portion 11. The first end portion 52 of the worm shaft 5 can be supported on the first body portion 11 via the axle bearing member. Additionally, a second end portion 53 of the worm shaft 5 is rotatably supported on the second body portion 12. The second end portion 53 of the worm shaft 5 can be supported on the second body portion 12 via the axle bearing member.

The second gear 35 described above is mounted to the first end portion 52 of the worm shaft 5. The worm shaft 5 is integrally rotatable with the second gear 35. The worm shaft 5 rotates in conjunction with the rotation of the handle 2. In particular, when the handle 2 is rotated, the second gear 35 is rotated via the drive shaft 31 and the first gear 34, and, as a result, the worm shaft 5 is rotated.

The guide member 6 is a member for guiding the sliding member 8. The guide member 6 is formed in a cylindrical shape and is disposed near the outer peripheral side of the worm shaft 5. The guide member 6 extends essentially parallel to the worm shaft 5. Additionally, the guide member 6 extends between the first body portion 11 and the second body portion 12. A first end portion of the guide member 6 is non-rotatably supported on the first body portion 11. Additionally, a second end portion of the guide member 6 is non-rotatably supported on the second body portion 12.

As shown in FIG. 1 and FIG. 3, the guide member 6 includes a window portion 61. The window portion 61 allows the engagement member 7 to engage the spiral groove 51. The window portion 61 is formed along a longitudinal direction of the guide member 6. That is, the window portion 61 is formed along the direction of the worm shaft 5. The window portion 61 is opened downward when using the dual-bearing reel 100.

As shown in FIG. 3, the engagement member 7 is formed so as to engage the spiral groove 51 of the worm shaft 5. The engagement member 7 extends from outside the guide member 6 to inside the guide member 6 via the window portion 61. The engagement member 7 comprises a shaft portion 71 and an engagement pawl 72. The shaft portion 71 is formed essentially in a cylindrical shape. The engagement pawl 72 is formed to engage the spiral groove 51. The shaft portion 71 and the engagement pawl 72 are integrally formed.

The sliding member 8 slides along the worm shaft 5. In particular, the sliding member 8 reciprocates along the worm shaft 5. The sliding member 8 is guided by the guide member 6. The sliding member 8 comprises a first through-hole 81 and a second through-hole 82. The first through-hole 81 corresponds to the through-hole of on embodiment of the present invention.

The first through-hole 81 is a hole for housing the engagement member 7. The cross-section of the first through-hole 81 is formed in a circular shape. A female threaded portion 811 is formed in at least one portion of an inner surface of the first through-hole 81. The first through-hole 81 communicates with the second through-hole 82.

The second through-hole 82 extends along the worm shaft 5. The guide member 6 passes through the second through-hole 82. An inner surface of the second through-hole 82 contacts the outer peripheral surface of the guide member 6. Accordingly, the sliding member 8 is guided by the guide member 6. The cross-section of the second through-hole 82 is formed in a circular shape.

As shown in FIG. 4, the sliding member 8 includes a fishing line guiding portion 83 for guiding a fishing line. The fishing line extends forward from the spool 4 through the fishing line guiding portion 83. The fishing line guiding portion 83 is a hole that passes through the sliding member 8 and is formed in a vertically elongated shape.

As shown in FIG. 3, the lid member 9 comprises a lid portion 91 and a retaining portion 92. The lid portion 91 is configured to cover one end of the first through-hole 81. The retaining portion 92 is formed in a cylindrical shape and extends from the lid portion 91. The retaining portion 92 is housed inside the first through-hole 81. Additionally, the retaining portion 92 is disposed between the inner surface of the first through-hole 81 and the outer peripheral surface of the engagement member 7. In particular, the retaining portion 92 is disposed between the inner surface of the first through-hole 81 and the outer peripheral surface of the shaft portion 71. The retaining portion 92 slidably and rotatably retains the engagement member 7.

The shaft portion 71 of the engagement member 7 is housed in the retaining portion 92. The inner diameter of the retaining portion 92 is designed to be around the same dimension as the outer diameter of the shaft portion 71 of the engagement member 7. In particular, the outer diameter of the shaft portion 71 is smaller than the inner diameter of the retaining portion 92 to the degree that the shaft portion 71 of the engagement member 7 is rotatable around the shaft in the retaining portion 92.

A male threaded portion 921 is formed on at least one portion of the outer peripheral surface of the retaining portion 92. This male threaded portion 921 is screwed into the female threaded portion 811 that is formed on the inner surface of the first through-hole 81. Thus, the retaining portion 92 is fixed to the sliding member 8 and retains the engagement member 7. As can be seen from FIG. 4, the outside surface of the lid member 9 is smoothly continuous with the outside surface of the sliding member 8.

Next, the operation of the level winding mechanism 50 formed in the way described above will be explained.

First, if the handle 2 is rotated, the worm shaft 5 is rotated via the drive shaft 31, the first gear 34, and the second gear 35. The engagement member 7 reciprocates along the worm shaft 5 with the rotation of the worm shaft 5. The engagement member 7 is retained by the lid member 9, and the lid member 9 is fixed to the sliding member 8, so both the sliding member 8 and the engagement member 7 are reciprocated along the worm shaft 5. As a result, the fishing line that is guided by the fishing line guiding portion 83 of the sliding member 8 is evenly wound on the spool 4.

The level winding mechanism 50 according to the present embodiment has the following characteristics.

The level winding mechanism 50 according to the present embodiment comprises a worm shaft 5, an engagement member 7, a sliding member 8, and a lid member 9. The worm shaft 5 includes a spiral groove 51. The engagement member 7 engages the spiral groove 51. The sliding member 8 includes a first through-hole 81 and slides along the worm shaft 5. The lid member 9 comprises a lid portion 91 and a retaining portion 92. The lid portion 91 covers one end of the first through-hole 81. The retaining portion 92 is tubularly shaped and is housed inside the first through-hole 81. Additionally, the retaining portion 92 is disposed between the inner surface of the first through-hole 81 and the outer peripheral surface of the engagement member 7. Thus, the retaining portion 92 can slidably and rotatably retain the engagement member 7.

In the level winding mechanism 50 described above, the engagement member 7 is retained by the tubular retaining portion 92. For this reason, compared to the conventional reciprocating mechanism, the retaining portion 92 is able to retain the engagement member 7 closer to the worm shaft 5. As a result, the retaining portion 92 is able to suppress the rattling when the engagement member 7 is reciprocated.

Additionally, as described above, since the retaining portion 92 is able to suppress the rattling of the engagement member 7, the axial length for retaining the engagement member 7 can be shorter than the prior art. That is, the axial length of the first through-hole 81 of the sliding member 8 can be shorter than in the prior art, and, thus, the sliding member 8 can be compact.

Although each embodiment of the present invention has been presented heretofore, the present invention is not limited to the embodiments and different modifications can be made without departing from the scope of the invention

MODIFIED EXAMPLE 1

Figure 5:
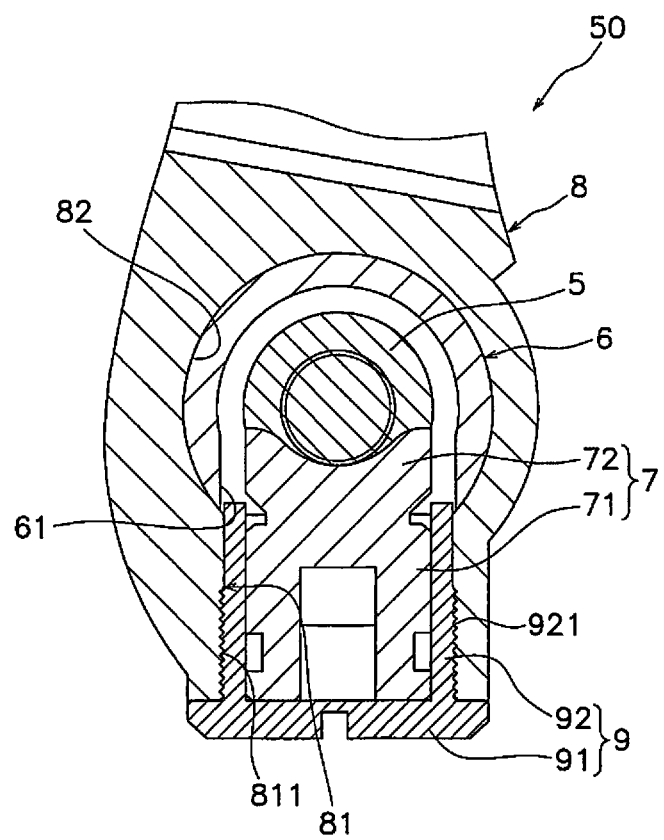
FIG. 5 is a cross-sectional view of the level winding mechanism according to a first modified example.

For example, as shown in FIG. 5, the retaining portion 92 of the lid member 9 can be configured so as to be longer than the length of the first through-hole 81 in the passing-through direction. By configuring the retaining portion in this way, the retaining portion 92 is able to retain the engagement member 7 closer to the worm shaft 5. Therefore, the rattling of the engagement member 7 can be reduced. The distal end portion of the retaining portion 92 is housed in the window portion 61 of the guide member 6.

MODIFIED EXAMPLE 2

Figure 6:
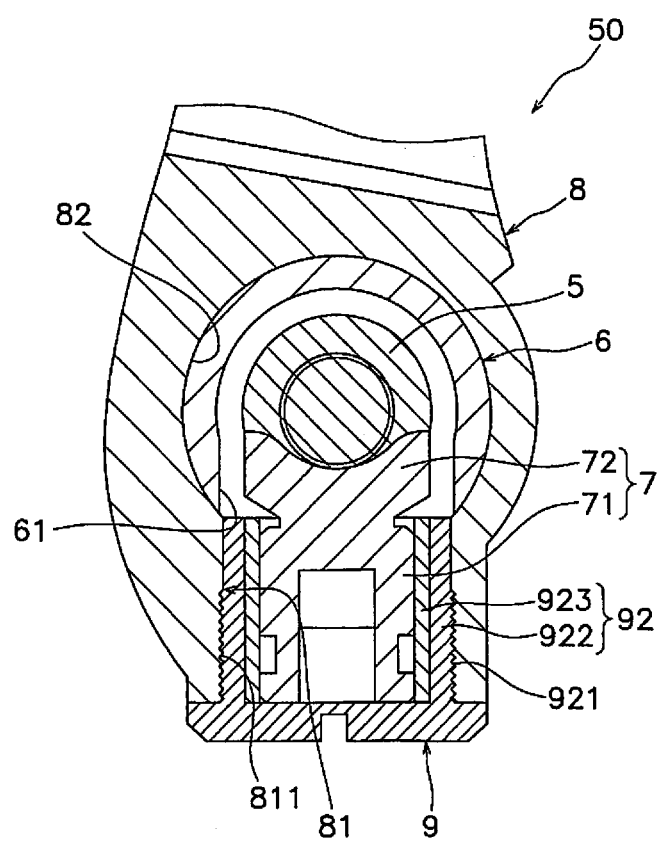
FIG. 6 is a cross-sectional view of the level winding mechanism according to a second modified example.

As shown in FIG. 6, the retaining portion 92 of the lid member 9 can be configured to comprise an outer tubular portion 922 and an inner tubular portion 923. The outer tubular portion 922 and the inner tubular portion 923 are formed by separate members. The outer tubular portion 922 contacts the inner surface of the first through-hole 81. In particular, the outer tubular portion 922 is formed in a tubular shape. The male threaded portion 921 described above is formed on the outer peripheral surface of the outer tubular portion 922.

Figure 7:
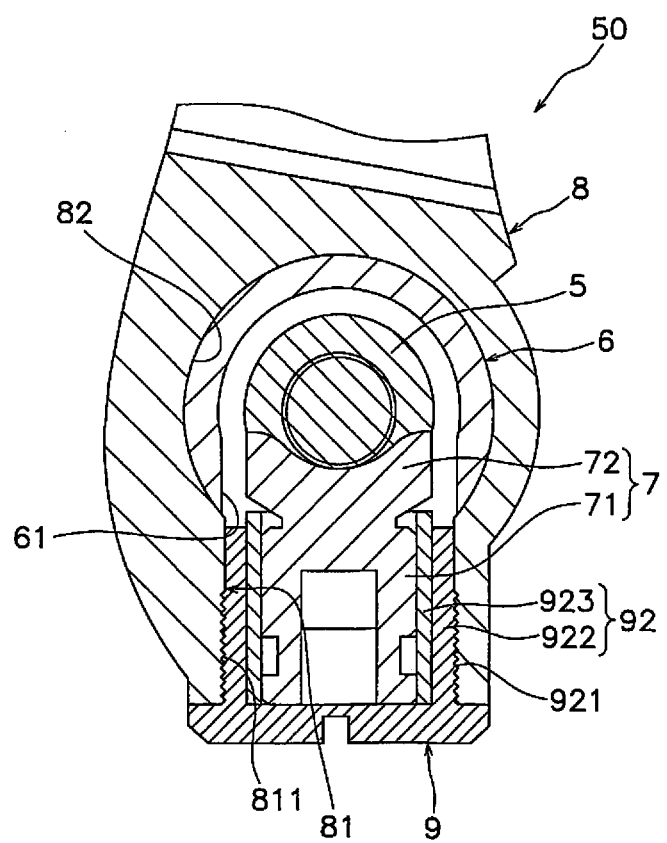
FIG. 7 is a cross-sectional view of another level winding mechanism according to the second modified example.

The inner tubular portion 923 is disposed between the inner surface of the outer tubular portion 922 and the outer peripheral surface of the engagement member 7. In particular, the inner tubular portion 923 is formed in a tubular shape. The inner tubular portion 923 can be, for example, a sliding bushing made of resin, or an axle bearing member. As shown in FIG. 7, the inner tubular portion 923 can be made longer than the length of the first through-hole 81 in the passing-through direction. Additionally, the outer tubular portion 922 can be shorter than the length of the first through-hole 81 in the passing-through direction.

MODIFIED EXAMPLE 3

The present invention can be applied not only to a level winding mechanism, but also to other reciprocating mechanisms of a fishing reel. For example, the present invention can be applied to an oscillating mechanism of a spinning reel. In this case, the sliding member evenly winds the fishing line on the spool, not by guiding the fishing line, but by reciprocating a spool shaft, to which the spool is fixed, in the longitudinal direction.

What is claimed is:

1. A reciprocating mechanism for a fishing reel, comprising:
   a worm shaft having a spiral groove;
   an engagement member engaging the spiral groove;
   a sliding member having a through-hole and being configured to slide along the worm shaft; and
   a lid member comprising a tubular retaining portion housed in the through-hole and a lid portion covering one end of the through-hole,
   the retaining portion being disposed between an inner surface of the through-hole and an outer peripheral surface of the engagement member, so as to slidably and rotatably retain the engagement member, the retaining portion comprising an outer tubular portion contacting the inner surface of the through-hole and an inner tubular portion disposed between an inner surface of the outer tubular portion and the outer peripheral surface of the engagement member.

2. The reciprocating mechanism recited in claim 1, wherein
   the inner tubular portion is a sliding bushing made of resin.

3. The reciprocating mechanism recited in claim 1, wherein
   the inner tubular portion is a bearing.

4. The reciprocating mechanism recited in claim 1, wherein
   a female threaded portion is formed on at least one portion of the inner surface of the through-hole, and
   a male threaded portion screwed to the female threaded portion is formed on at least one portion of the outer peripheral surface of the retaining portion.

5. The reciprocating mechanism recited in claim 1, wherein
   the retaining portion is longer than the length of the through-hole in a penetrating direction.

6. The reciprocating mechanism recited in claim 1, further comprising
   a tubular guide member having a window portion configured to enable the engagement of the spiral groove and the engagement member, and being disposed on an outer peripheral side of the worm shaft, to guide the sliding member.

7. The reciprocating mechanism recited in claim 1, wherein the sliding member comprises a fishing line guiding portion for guiding a fishing line.

8. A reciprocating mechanism for a fishing reel, comprising:
   a worm shaft having a spiral groove;
   an engagement member engaging the spiral groove;
   a sliding member having a through-hole and being configured to slide along the worm shaft;
   a lid member comprising a tubular retaining portion housed in the through-hole and a lid portion covering one end of the through-hole; and
   a tubular guide member having a window portion configured to enable the engagement of the spiral groove and the engagement member, and being disposed on an outer peripheral side of the worm shaft, to guide the sliding member
   the retaining portion being disposed between an inner surface of the through-hole and an outer peripheral surface of the engagement member, so as to slidably and rotatably retain the engagement member, at least one portion of the retaining portion being housed in the window portion.

* * * * *